Feb. 9, 1937. A. F. VICTOR 2,070,325
PROJECTOR FOR MOTION PICTURES
Filed Jan. 3, 1936 3 Sheets-Sheet 1
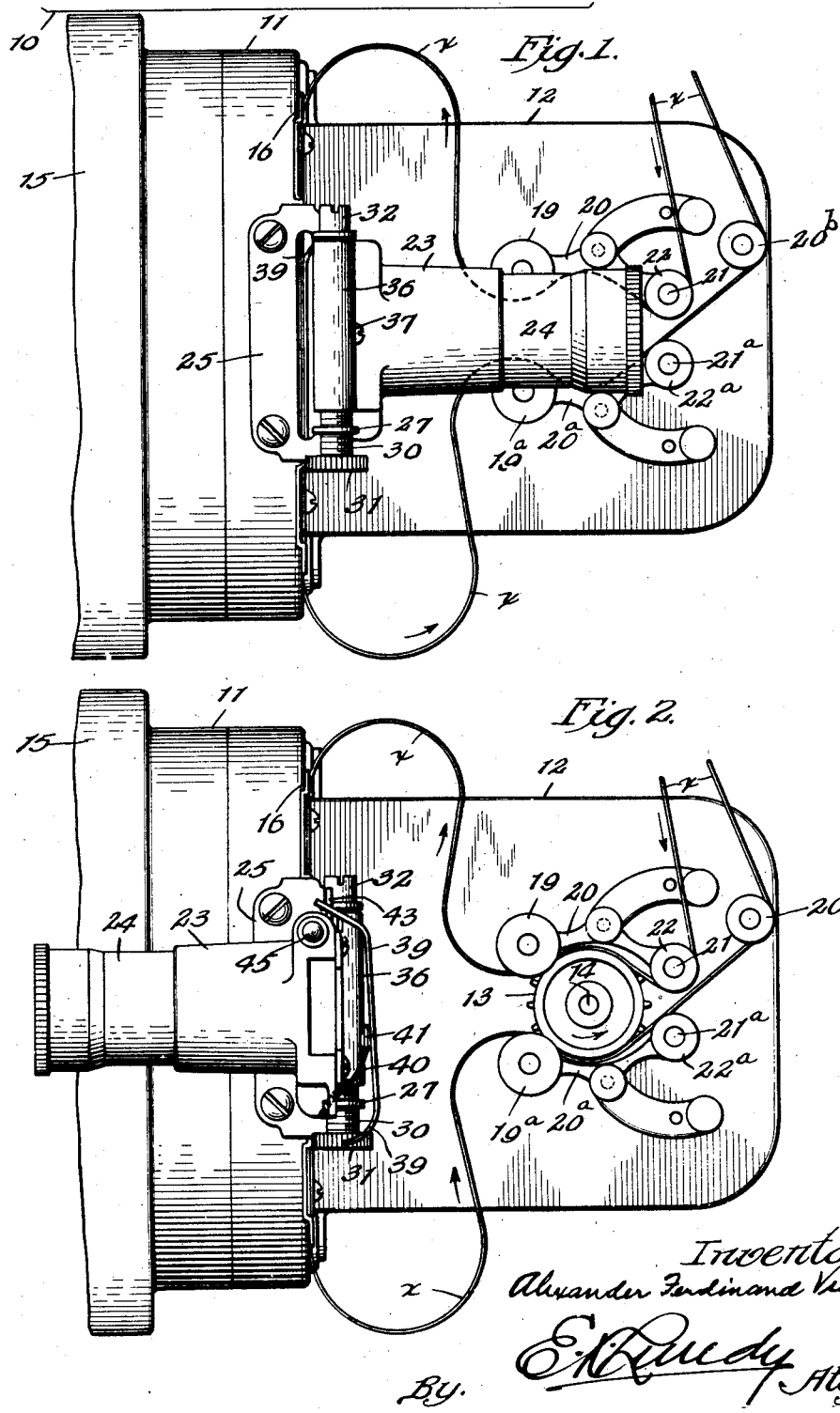

Feb. 9, 1937.  A. F. VICTOR  2,070,325
PROJECTOR FOR MOTION PICTURES
Filed Jan. 3, 1936  3 Sheets-Sheet 2
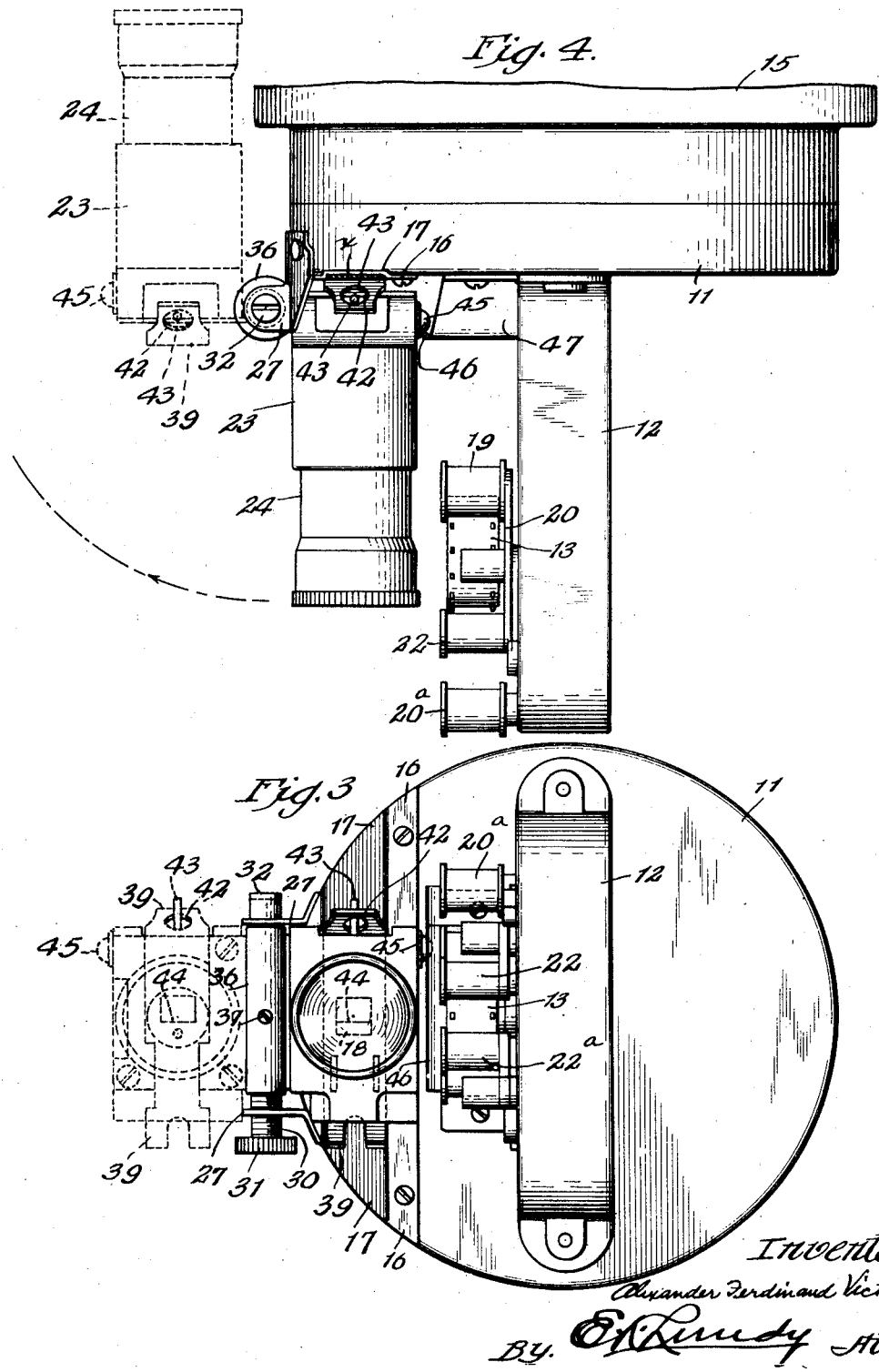

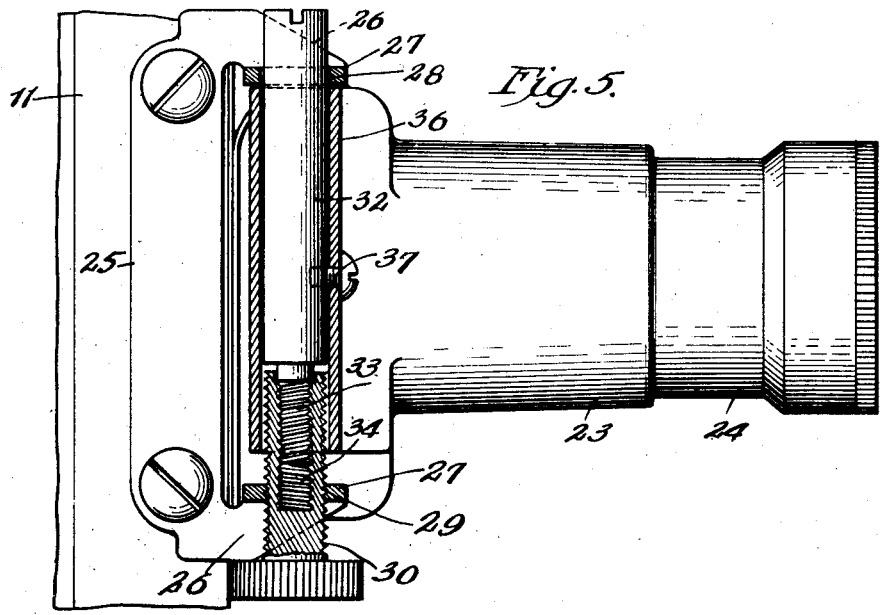

Patented Feb. 9, 1937

2,070,325

UNITED STATES PATENT OFFICE 2,070,325

PROJECTOR FOR MOTION PICTURES

Alexander Ferdinand Victor, New York, N. Y.

Application January 3, 1936, Serial No. 57,351

13 Claims. (Cl. 88—24)

My present invention has reference to cinematographic projectors of the type used by amateurs, and the specific improvement relates to the manner of supporting what is termed the "lens mount" or focusing tube and to the "framer" for properly positioning the pictures upon the screen.

On account of the compact form in which amateur projectors are made the area adjacent the "lens mount" is frequently so crowded with necessary mechanism that difficulty is experienced by the operator when threading or mounting the film strip upon the mechanism prior to starting the operation of the projector. Still greater difficulty is noted when the projector is housed within a cabinet or carrying case, and this is true not only with respect to the "lens mount" or projection tube, but also in connection with the manually operated member by which the pictures are framed upon the screen.

In order to overcome the above-mentioned inherent objections I have devised a novel structure wherein the "lens mount" or projection tube is arranged to swing in a horizontal plane away from the adjacent housing or towards the operator so that the film channel and aperture plate are readily accessible to the operator for cleaning the same, and at the same time the film moving sprocket and film retaining shoes are unobstructed, thus permitting the film to be more easily threaded upon the mechanism.

Also I have provided a framing structure for adjusting the relative position of the image upon the screen, which structure is a part of or connected with the lens-mount structure. To accomplish these results I have hinged the film gate, which is a part of or carries the lens mount, upon an element that may be rotated for the purpose of raising and lowering the structure for the proper framing of the projected pictures. Thus it will be seen I have been able to centralize these controls within a restricted area and I have also rendered other parts of the mechanism more accessible to the operator.

Some of the objects of my improvements reside in providing an apparatus of the character herein described that is compact and is simple in construction; that is dependable in operation; that is easy to manipulate; and is novel in the arrangement of its parts so that my improvements may be incorporated in a small projector especially adapted for amateur use. Further objects and advantages will be obvious to persons skilled in the art after the construction and operation of my invention is understood from the herein description.

I prefer to accomplish the numerous objects of my invention and to practice the same in substantially the manner hereinafter specifically described and as more particularly pointed out in the appended claims. In connection with this description reference is herein made to the accompanying drawings that form a part hereof.

In the drawings:—

Figure 1 is a vertical side elevation of a portion of a motion picture projecting apparatus showing my improvements thereon with the parts in normal operative positions for operation.

Figure 2 is a view similar to Figure 1 showing the lens mount and film gate swung open for access to the film guide, sprocket and related parts.

Figure 3 is a vertical front elevation of portions of the structure illustrated in Figure 1 and showing the gate and lens opened in dotted position.

Figure 4 is a top plan of the structure illustrated in Figure 1, showing the opened position in dotted lines.

Figure 5 is an enlarged fragmentary view of the gate, lens-mount, etc., showing the pivot or hinge thereof in vertical section.

Figure 6 is another enlarged fragmentary view showing the relative positions of the parts with the framer and projection aperture in vertical section with the framer in an upper position.

Figure 7 is a view similar to Figure 6 showing the framer, etc., in a lower position.

The structure on which my improvements are shown as applied is a projector employing 16-mm. film and is especially adapted for use by amateurs. For this purpose the apparatus is quite compact in construction to permit convenience in handling and facility in use or operation. While only fragmentary portions of the projector are shown it will be understood that parts of the mechanism are enclosed in a suitable housing that is supported by a standard and the apparatus is stored within a carrying-case or cabinet for ready transportation.

The plane of the inner surface of the horizontal top wall of this carrying-case or cabinet is conventionally illustrated in Figure 1 by the line 10 in order to show its close relation to the adjacent parts of the projector. The novel construction of the cabinet or case is the subject-matter of a co-pending application for United States Letters Patent filed by Elmer R. Sharp for an improved "Portable case for motion picture projectors", and in this connection it will be understood the base of the standard is anchored to the bottom wall of the case while the side of said case is in the form of a door-section that is opened during use of the projector to permit access to the controls thereof.

The body portion of the projector consists of a circular or cylindrical two-part housing 11 enclosing the intermittent film feeding devices and other associated parts, and there is a laterally disposed rectangular housing 12 extending at a right angle from the front wall of housing 11 to enclose other mechanism such as the actuating gears, etc., for the film moving sprocket 13. This sprocket is anchored to the outer end of a driven spindle 14 that projects out of its bearing in the adjacent side wall of the rectangular housing 12.

At the rear of the cylindrical housing there is a lamp-house 15 containing an electric bulb that supplies illumination for projecting the pictures, while on the opposite or front wall of housing 11 there is an elongated vertical opening that is closed by a vertically disposed plate 16 formed with a longitudinal depression 17 that provides a channel in which the film is guided in its movement past the projection aperture 18 in the guide alining horizontally with the light source and at the axis of the projected light beam.

The advancing portion of the film $x$ is formed into a feed loop between the sprocket 13 and the guide or channel 17, and after passing out of the lower portion of said guide the film is formed into another or take-up loop before reaching the sprocket. The feeding portion of the film is retained on the upper segment of the sprocket by a flanged and grooved roller 19 that is rotatably mounted on a lateral spindle at the adjacent end of an arm 20 which has its opposite end swingingly mounted on a pivot 21 projecting from the adjacent wall of housing 12 and an idle roller 22 on the pivot 21 guides the film to the sprocket from the supply or feed reel (not shown).

Similarly, the take-up portion of the film is retained on the lower segment of sprocket by a flanged and grooved roller 19$^a$ rotatable on a lateral spindle at one end of an arm 20$^a$ that is swingingly mounted on a pivot 21$^a$, which pivot also carries an idle roller 22$^a$ to guide the film away from the sprocket. Another flanged roller 20$^b$ guides the film to the rewind or take-up reel (not shown) after the film leaves the roller 22$^a$.

Suitable mechanism inside cylindrical housing 11 intermittently moves the film down through the guide channel 17 so that the pictures successively pass the light aperture 18, and, as seen in Figures 3 and 4, the axis of projection is in a vertical plane slightly to one side of the adjacent outer surfaces or ends of the sprocket and rollers just previously described. The sleeve 23 carrying the adjustable slidable lens tube 24, which comprises portions of the lens-mount and film gate, are so positioned that they are in very close relation to said sprocket and rollers, and, heretofore it has been the practice to arrange the structure so that it will swing upwardly in the vertical plane of the projection axis when "threading" the film through the projector preparatory to operating the apparatus.

It has also been the practice to place the rotatable shaft or screw, which bodily moves the film gate (including the lens mount) vertically for "framing", alongside the pivot of the film gate and in the corner formed at the juncture of the two housings 11 and 12, so that the hand button for operating the screw is slightly above said housings. This arrangement is inconvenient where the projector is enclosed within a carrying case or cabinet for the reason that in order to economize space the walls of the case or cabinet are disposed close to projecting parts of the apparatus with the result that difficulty is experienced in attempting to reach certain of the control elements and operate them by hand.

As before stated, I have effectively overcome these inherent objections by means of my novel improvements wherein the gate and lens mount are supported in a manner that permits these parts to be moved or swung outwardly, substantially in a horizontal plane, away from the apparatus, thus temporarily removing these parts from their normal operative position near the sprocket and rollers, and thereby also clearing the space in front of the film channel.

This, it will be seen, leaves the channel entirely unobstructed for cleaning the same and it also permits of a simpler threading of the film through its path in the projector. In doing this I have placed the framer screw at the outer side of the film channel where it is nearer and more convenient to the operator, and I have utilized this said screw as the hinge, pin or pintle for swingingly supporting the film-gate and lens-mount so that these parts will readily swing outwardly away from the adjacent operative parts of the projector.

The above mentioned improvements are shown in detail in Figures 2, 3 and 4. A supporting plate 25, of bowed or segmental shape, is secured to curved side wall of cylindrical housing 11 adjacent the film channel plate 16, and the upper and lower ends of this plate are provided with lateral extensions or arms 26 that project beyond the housing where they are preferably bent into horizontally disposed ears or lugs 27. Alining apertures 28 and 29 are made in the respective upper and lower ears, the former 28 being smooth bored while the latter is threaded as shown in Figure 5.

A cam member in the form of a screw or bolt 30, having a knurled head 31, is rotatably mounted in the threaded aperture 29 of the lower ear, and a smooth-surfaced pintle 32 has its upper portion movably mounted in the smooth aperture 28 of the upper ear. This pintle is preferably shorter than the distance between the ears 27, and at its lower end it is reduced in diameter and is provided with a threaded stud 33 that projects axially therefrom into a threaded bore 34 made in the bolt 30. When the bolt is screwed up into the aperture 27 it will also screw up on the stud 33 providing the pintle is maintained in a non-rotatable relation with respect to the bolt, and thus the pintle may be moved up or down in its journal in the smooth aperture 28 in the upper ear 27. The screw and the pintle combined form the framer operating structure which is substituted for the usual one-piece elongated framer screw heretofore used.

The sleeve 23 for holding the lens tube 24 has an irregularly shaped cut-out plate 35 secured to its transverse rear end which is normally adjacent the film guide plate 16 and the vertical outer edge portion of this plate is formed into an elongated cylindrical-shaped hinge knuckle 36 that surrounds the pintle 32 and adjacent portion of the screw 30, as shown in detail in Figures 5, 6 and 7, and said knuckle is anchored to said pintle by a screw 37 so that the pintle and lens mount move with each other as a unit.

This arrangement permits the hinging action of the sleeve and lens as before mentioned and also allows the sleeve and lens to be raised and lowered in a vertical plane in front of the projection aperture 18 whenever the pintle is moved up or down by the adjusting screw or bolt 30.

For the purpose of maintaining the film x in guide channel 17 in its normal path through the projector past the aperture 18 a yieldable presser-foot is mounted on the rear of the sleeve 23. This presser-foot is preferably an elongated metal plate 38 of a width to enter and fit the film channel and engage the outer face of the film. The upper and lower portions 39 of this plate 38 are curved or deflected in a direction away from the channel 17 or towards the rear of the sleeve so that said ends extend above and below said sleeve. To yieldably mount the presser-foot, a leaf-spring 40 is anchored preferably at one end to a lower portion of said sleeve 23 and projects obliquely therefrom to an intermediate portion of the presser-foot plate to which it is connected by a swivel-joint 41, that permits tilting and universal movement of the presser-foot. In order to somewhat limit the movement of the presser foot the upper end of the latter is provided with a hole 42 that surrounds a pin 43 projecting up from the top of the rear portion of the lens mount structure.

Adjacent the swivel-joint 41 the presser-foot is provided with a rectangular shaped opening or window 44, known generally as the "framing aperture", that registers with the projection aperture 18 but is of less height than the latter aperture. The center of the framing aperture 44 alines with the focal axis of the projection lens system carried in the lens mount, and when the framing screw 30 is rotated it will raise or lower the lens-mount structure and the framing aperture will be adjusted vertically in front of the projection aperture 18 so that the successive frames or pictures on the film will be properly alined and the projected pictures will be raised or lowered in order to be registered or framed on the screen.

It will be obvious the "threading" of the film through the projector has been considerably simplified and may be performed more readily through the use of my novel arrangement of the lens-mount, because the latter is moved entirely out of the space between the film channel and the sprocket. Also the framing may be done with more facility than when the adjusting button or head 31 is located at the top of the projector where it will be quite close to the upper wall of a cabinet or carrying case. In order to maintain the lens-mount in its closed or operative position (Figs. 1 and 3) it is provided with a spring ball-detent 45 which snaps or latches behind the oblique vertical edge 46 of a strike plate 47 mounted on a convenient portion of the housing.

What I claim is:—

1. In a motion-picture projector a casing having a light aperture, vertically spaced bearings on said casing adjacent said aperture, a projection lens-tube extending forward from said aperture, a vertical pintle journaled in said bearings and connected to said tube, said pintle embodying a hinge portion and a rotatable threaded element for moving said hinge pin portion upon its axis to raise and lower the lens-tube, said pintle adapted for hinging movement whereby to swing said tube horizontally away from said aperture.

2. Means for adjustably mounting a lens-tube upon a motion-picture projector embodying alined vertically spaced bearings, a hinge-pin journaled in one of said bearings, a rotatable bolt threaded into the other bearing and engaged with said hinge-pin whereby said pin may be bodily moved vertically, and a lens-tube operatively connected to said hinge-pin and movable vertically therewith, said pin and tube also movable about the axis of said pin.

3. Means for adjustably mounting a lens-tube upon a motion-picture projector comprising a support having vertically spaced bearings, the upper bearing having a smooth bore and the lower bearing being threaded, a hinge-pin the upper portion of which is rotatably and slidably journaled in said upper bearing, a rotatable bolt screwed into said lower bearing and engaged with said hinge-pin for bodily moving said pin up and down in its bearing, and a lens-tube secured to said hinge-pin and movable vertically therewith, said pin and tube also adapted for horizontal hinging movement upon the axis of the pin in any position to which they have been moved vertically by said bolt.

4. Means for adjustably mounting a lens-tube upon a motion-picture projector comprising a support having vertically spaced bearings, a hinge-pin journaled at one end in one of said bearings, a threaded stud extension on the other end of said pin, a rotatable bolt threaded into the other bearing and having a threaded bore engaged with said stud adapted for bodily moving said hinge-pin vertically, and a lens-tube connected to said hinge-pin and movable vertically therewith, said pin and tube also adapted for hinging movement upon the axis of said pin.

5. Means for adjustably mounting a lens-tube upon a motion-picture projector comprising a support, vertically spaced bearings thereon, the upper bearing having a smooth bore and the lower bearing having a threaded bore, a hinge-pin the upper portion of which is rotatably and slidably journaled in said upper bearing, a threaded stud extension on the lower end of said pin, a rotatable bolt screwed into said lower bearing and having a threaded bore engaged with said stud adapted for bodily moving said pin vertically, and a lens-tube connected to said hinge-pin and movable vertically therewith, said pin and tube also adapted for hinging movement upon the axis of said pin.

6. Means for adjustably mounting a lens-tube upon a motion-picture projector comprising a support having vertically spaced bearings, a hinge-pin journaled at one end in one of said bearings and having threads upon its other end, a rotatable bolt threaded into the other bearing and having a threaded bore screwed upon the threaded end of said pin and adapted for bodily moving said hinge-pin vertically, and a lens-tube connected to said hinge-pin and movable vertically therewith, said pin and tube also adapted for hinging movement upon the axis of said pin.

7. Means for adjustably mounting a lens-tube upon a motion-picture projector comprising a support, vertically spaced bearings thereon, the upper bearing having a smooth bore and the lower bearing having a threaded bore, a hinge-pin the upper portion of which is mounted in said upper bearing and the lower portion of which is threaded, a rotatable bolt screwed into said lower bearing and having a threaded bore engaged with the threads on said pin adapted for bodily moving said pin vertically, and a lens-tube carried by said pin and movable vertically therewith, said tube also adapted for hinging movement around the axis of said film.

8. Means for adjustably mounting a lens-tube upon a motion-picture projector comprising a support, vertically spaced bearings thereon, the upper bearing having a smooth bore and the lower bearing having a threaded bore, a rotatable hinge-pin the upper portion of which is journaled in said upper bearing and the lower portion of which is threaded, a rotatable bolt screwed into said lower bearing and having a threaded bore engaged with the threads on said pin adapted for bodily moving said pin vertically, and a lens-tube connected to said pin and movable vertically therewith, said pin and tube also adapted for horizontal hinging movement upon the axis of said pin.

9. In a motion-picture projector a casing, a vertical film track thereon having a light aperture, a film gate in front of said track having a framer opening co-operating with said aperture, a projection lens tube carried by said gate in axial alinement with said framer opening, substantially vertically alined spaced bearings on said casing, a pintle journaled in said bearings and embodying means for adjusting the same longitudinally of its axis and means operatively connecting said gate to said pintle, whereby said gate and lens-tube may be moved horizontally upon the axis of said pintle away from said film track and may also be adjusted vertically with respect to the aperture in said film track.

10. In a motion-picture projector a casing having a light aperture, a film gate mounted for swinging movement upon said casing and having a framer opening co-operative with said aperture, a lens tube on said gate axially alined with said framer opening, spaced vertically alined bearings on said casing, and hinge members operatively connecting said gate and bearings, said members embodying a pin secured to said gate and journaled in one of said bearings and threaded elements engaged in the other bearing for moving said pin longitudinally upon its axis whereby to adjust said gate and lens tube vertically with respect to said light aperture.

11. In a motion-picture projector a casing, a vertical film track thereon having a light aperture, a film gate coacting with said track and having a framer opening normally registered with said light aperture, a lens-tube on said gate axially alined with said framer opening, and a pintle secured to said gate and having end portions journaled in said bearings whereby said gate and lens tube may be hingedly moved in a horizontal plane away from and towards said track, said pintle embodying a threaded element engaged in one of said bearings for moving said pintle longitudinally of its axis and thereby adjust the framer opening of the gate with respect to said light aperture.

12. In a motion-picture projector a casing, an apertured film track thereon, a gate adjacent said track, a presser-foot yieldably mounted on said gate and normally engaged in said track, said presser-foot having a framer opening normally registered with the aperture in said track, a lens-tube on said gate axially alined with said framer-opening, bearings on said casing adjacent said track, and a pintle operatively mounting said gate in said bearings for horizontal swinging movement of said gate away from said track, said pintle embodying means for bodily moving said gate and the elements thereon in a vertical direction in front of said track to thereby change the position of said framer opening with respect to the aperture in said track.

13. In a motion-picture projector a casing, an apertured film track thereon, a film gate in front of said track having a framer opening co-operating with said film track aperture, a projection lens tube on said gate axially alined with said framer opening, vertically spaced alined bearings on said casing, and hinging means movably connecting said gate to said bearings for horizontal movement away from and toward said track, said means also embodying elements for causing a relative vertical movement between said gate and said track.

ALEXANDER FERDINAND VICTOR.